United States Patent [19]

Epworth

[11] 4,238,648
[45] Dec. 9, 1980

[54] TERMINATION FOR TELECOMMUNICATION PATH

[75] Inventor: Richard E. Epworth, Bishop's Stortford, England

[73] Assignee: International Standard Electric Corporation, New York, N.Y.

[21] Appl. No.: 6,625

[22] Filed: Jan. 26, 1979

[30] Foreign Application Priority Data

Feb. 2, 1978 [GB] United Kingdom ............... 04247/78

[51] Int. Cl.³ .................. H04B 9/00; G02B 27/00
[52] U.S. Cl. .................. 179/170 D; 179/16 F; 250/551; 455/601
[58] Field of Search .......... 350/96.15; 250/199, 250/227, 551; 179/1 C, 2 C, 16 EA, 170 D, 170 R, 16 F; 455/601, 602, 606

[56] References Cited

U.S. PATENT DOCUMENTS

| 3,717,769 | 2/1973 | Hubbard et al. | 250/199 |
| 3,792,284 | 2/1974 | Kaelin | 250/551 |
| 3,809,908 | 5/1974 | Clanton | 250/551 |
| 4,023,887 | 5/1977 | Speers | 350/96.15 |
| 4,104,533 | 8/1978 | Iverson | 250/551 |
| 4,130,343 | 12/1978 | Miller et al. | 350/96.15 |

FOREIGN PATENT DOCUMENTS 2724850 7/1978 Fed. Rep. of Germany ........ 350/96.15

*Primary Examiner*—Raymond F. Cardillo, Jr.
*Assistant Examiner*—Randall P. Myers
*Attorney, Agent, or Firm*—John T. O'Halloran; Jeffrey P. Morris

[57] ABSTRACT

A connector arrangement for optical fibers which includes programmable means for presetting an equalizer in a repeater connected to the fiber or adjusting the laser or LED power levels in a transmitter connected to the fiber. The equalizer coefficients (or the output power) depend on the fiber characteristics which remain constant at all times. Therefore, it is possible to preset the coefficents (or power) when replacing a repeater or a transmitter.

5 Claims, 2 Drawing Figures

TERMINATION FOR TELECOMMUNICATION PATH

BACKGROUND OF THE INVENTION

This invention relates to a path termination arrangement suitable for use in telecommunication transmission systems, particularly but not exclusively those employing optical fibers as a transmission medium, over distances which require the use of repeaters.

One of the problems associated with the use of repeaters in transmission systems is that equalization is usually required at the repeaters in order to minimize distortion caused by dispersion in the transmission medium. In optical fiber systems a wide range of dispersion must be catered for.

Conventionally, equalizers for optical fiber systems must be adjusted whenever a repeater is replaced in the systems. The dispersion of a given optical path is related to the optical cable (or fiber) rather than the repeaters. Therefore, it is possible to measure the dispersion of a length of optical fiber or cable and predict the equalizer settings required for that length. Once the optimum equalizer settings have been determined then these can be used for all equalizers used for that length.

According to the present invention there is provided a termination for a telecommunication transmission path including a two-part demountable connector device one part of which is adapted to receive one end of a length of transmission medium forming said path, an electrical circuit arrangement to which the other connector part is connected, said electrical circuit having one or more adjustable portions, the one part of the connector being provided with means for adjusting the adjustable portions of the electrical circuit arrangement, the two parts of the connector device incorporating means for connecting the programmable adjusting means of the one part to the adjustable portions of the electrical circuit arrangement when the length of transmission medium is connected to the electrical circuit arrangement.

Embodiments of the invention will now be described with reference to the accompanying drawings, in which.

DETAILED DESCRIPTION OF THE INVENTION

Figure 1:
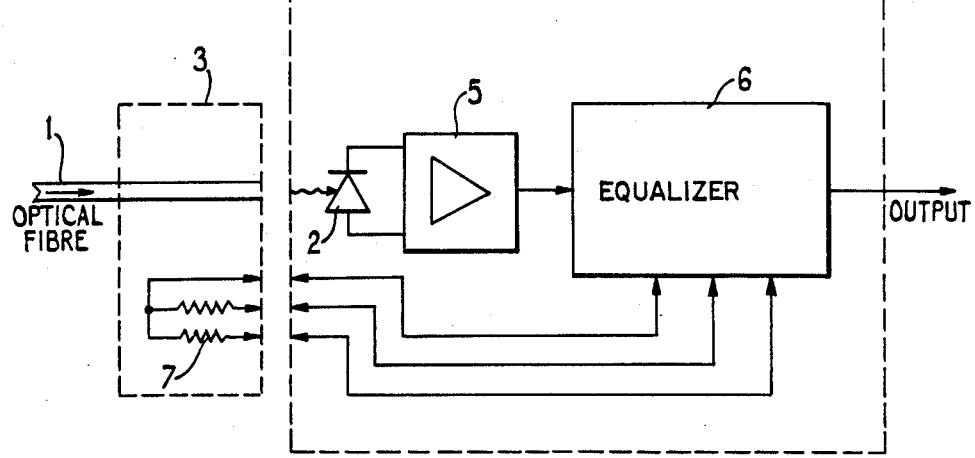
FIG. 1 illustrates a termination arrangement for connecting an optical fiber transmission path to an equalizer.

In the arrangement shown in FIG. 1 an optical fiber 1 is coupled to an avalanche diode photodetector 2 by means of a two-part connector 3, 4. By way of illustration but not limited thereto, this connector can be an ITT Cannon type PVX multi-way connector in which some of the connector positions are used for optical fiber connections and others for electrical connections. Another type of suitable multi-way connectors is Cannon type G06 adapted to have both fiber optic and electrical connections in the same connector. The optical fiber end is located in connector part 3 and the diode in connector part 4. The connector parts are not shown in mechanical detail since there is no restriction on the design of the connectors as such. In the drawing connector part 4 is shown as also including a low noise amplifier 5 and an equalizer circuit 6. The amplifier 5 can be selected from any low noise amplifier with input characteristics suitable for accepting signals from a photodetector. In a preferred embodiment, a transimpedance or high impedance amplifier is utilized. However, any amplifier having satisfactory input matching and acceptable low noise characteristics may be utilized according to this invention. These last two components may alternatively be physically separate from the connector and merely connected to connector part 4 by means of wires. The equalizer circuit is designed as an adjustable equalizer and the necessary adjustments are effected by setting certain component values, e.g. resistors. As previously explained, the equalization is determined primarily by reference to the dispersion of the optical fiber transmission path. The adjusting components 7 are therefore physically remote from the equalizer and are located in the connector part 3. Connector parts 3 and 4 have connection means additional to that for the optical fiber whereby when they are connected together the components 7 are connected to the equalizer circuit 6. If now it becomes necessary to replace the amplifier/equalizer arrangement with another, the replacement equalizer is immediately automatically correctly adjusted for the optical fiber path when the connection is made.

The above example refers to electrical programming of the equalizer. The programming could of course be mechanical, the connector part 3 having lugs or the like whose precise positions or dimensions interact with mechanically adjustable devices in connector part 4. An adjustable equalizer could use varicap diodes, pin diodes, FET's etc. as the control elements in the circuit. The determination of the dispersion or other characteristics which affect the equalizer settings can be achieved by substituting a manually adjustable equalizer and effecting adjustments for the optimum "eye" diagram and lowest error rate. The adjustment settings are then read off and corresponding fixed value components are installed in connector part 3.

Figure 3:
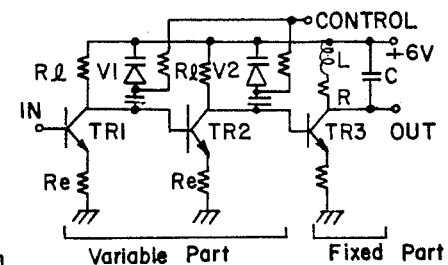
FIG. 3 illustrates an equalizer circuit.

An equalizer circuit that can be used in this invention is illustrated in FIG. 3 and in "Equalizer For Step-Index Fiber Transmission System", Third European Conference on Optical Communication, Munich, Sept. 14–16, 1977, pp 202–204. The variable equalizer is divided into fixed equalization part and variable equalization part. The former realizes the characteristic for the narrowest bandwidth fiber by the LCR resonant circuit. The variable equalization part realizes the second order low-pass filter using two variable capacitance diodes (V1, V2). The fourth order cut-off characteristics in the higher frequency region is realized by the cut-off characteristics of the transistor (TR1, TR2, TR3). According to this invention, the adjusting components 7 of FIG. 1 can be used to set the control signals required for the variable capacitance diodes V1 and V2 in FIG. 3.

Figure 2:
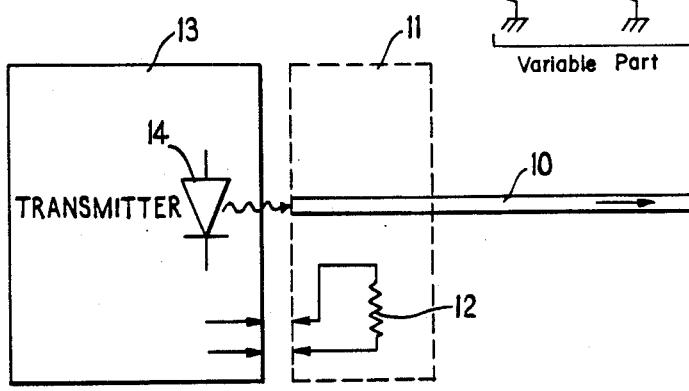
FIG. 2 illustrates a termination arrangement for connecting an optical fiber transmission path to transmitter.

A similar arrangement may be used to control the output power of a laser at the input end of the optical fiber, as shown in FIG. 2. In this case the input end of the optical fiber 10 is located in connector part 11 which also includes a circuit component 12 which, when connector part 11 is connected to a complementary part of transmitter 13, automatically sets the output level of the transmitter laser 14.

It is contemplated that a variety of LED or laser transmitters can be utilized for the transmitter 13. Suitable transmitters are disclosed in United Kingdom Patent Application No. 5479/76. According to this invention the circuit component 12 is used to adjust the basic biassing and modulation levels of the transmitters in the above-noted application, e.g., $P_{O(Ref)}$ and $P_{m(Ref)}$ respectively. The laser or LED may be required to operate at a level dictated by the optical fiber link characteristics.

When an optical fiber link is required to operate over a shorter distance than the maximum usable distance excess optical power is delivered to the photodetector at the receiving end. This can be a disadvantage, for example in requiring a wide dynamic range of operation of the receiver. With very short distances overload of the photodetector may occur. If the transmitted power can be reduced at source these problems can be avoided. Also, if the laser is operated at below maximum output its useful life can be considerably prolonged. Both lasers and light emitting diodes currently exhibit lifetimes which are a function of power output. Many semiconductor lasers, for example, show a degradation rate which is roughly proportional to power output. In this situation the useful life can be doubled by halving the optical power output level. The power output required is related to the fiber losses which in turn are related to the length of the link. Reduction of maximum loss by 3dB typically represents less than a 10% reduction in fiber route length. It is advantageous therefore that for shorter lengths the laser power be reduced accordingly and this is automatically achieved by the arrangement of FIG. 2. Again, when the transmitter laser is replaced the new transmitter is immediately and automatically adjusted for the link to give maximum life and reduced receiver dynamic range.

In some cases optical fibers are combined with electrical power conductors (copper wires) in a multi-core cable. In such systems it is possible to use the conductors for laser level control purposes in the transmitter. The conductors are terminated in the same connector part as the optical fiber, i.e. in a multi-way connector. The laser energizing circuit has level control components which are connected to the power circuits in the transmitter which in turn are connected to the conductors in the cable. In one arrangement the receiver transmits in the power conductors level control signals which are used to set the laser output power, this compensates for spurious unpredictable changes in optical path losses. In another arrangement the transmitter is provided with means for measuring the electrical resistance of the conductors in the link, this being proportional to the length. For this purpose it may be necessary to loop temporarily two conductors at the receiver if the DC resistance is to be measured. Alternatively the cable may incorporate a conductive strain member and the electrical resistance of this and one power conductor looped together may be measured. These last two arrangements have the advantage that they can compensate for variations of optical path loss which are predictably proportional to length.

While I have described above the principles of my invention in connection with specific apparatus it is to be clearly understood that this description is made only by way of example and not as a limitation to the scope of my invention as set forth in the objects thereof and in the accompanying claims.

I claim:

1. In an electrical termination for a telecommunication transmission path having a two-part demountable connector device, one part of which is adapted to receive one end of a length of transmission medium forming said path, an electrical circuit to which the other connector part is connected, said electrical circuit comprising:

one or more adjustable programmably components, the one part of the connector being provided with means for adjusting said adjustable components of said electrical circuit, whereby said two parts of the connector device further comprise means for connecting said adjusting means of the one part of said connector to said adjustable programmably components of the electrical circuit arrangement when the length of transmission medium is connected to the electrical circuit arrangement.

2. A termination according to claim 1 wherein the transmission medium is an optical fiber.

3. A termination according to claim 2 wherein the electrical circuit comprises a photodetector device coupled to an equalizer and the adjusting means in the one part comprise electric circuit components electrically connected to the adjustable components when the connector parts are connected together.

4. A termination according to claim 3 wherein the photodetector is coupled to the equalizer by a low noise amplifier.

5. A termination according to claim 3 wherein said photodetector device comprises an avalanche diode.

* * * * *